United States Patent [19]
Csaposs et al.

[11] 3,874,242
[45] Apr. 1, 1975

[54] PRESSURE-RESPONSIVE INSTRUMENT

[75] Inventors: James Csaposs, Maywood; Heinz Eberhard, Kinnelon; Anton Menzer, Teaneck, all of N.J.

[73] Assignee: Springfield Instrument Company, Inc., Hackensack, N.J.

[22] Filed: June 20, 1973

[21] Appl. No.: 371,830

Related U.S. Application Data

[62] Division of Ser. No. 279,980, Aug. 11, 1972.

[52] U.S. Cl............. 73/432 A, 73/386, 73/410, 74/89.2
[51] Int. Cl.............................................. G01i 7/06
[58] Field of Search............ 73/386, 387, 384, 410, 73/393, 432 A; 92/40; 74/89.2, 82.21, 82.22

[56] References Cited
UNITED STATES PATENTS
2,311,900  2/1943  Newell.................................. 92/40
3,491,603  1/1970  Harris.............................. 74/89.22

*Primary Examiner*—Donald O. Woodiel
*Attorney, Agent, or Firm*—Amster & Rothstein

[57] ABSTRACT

A motion-transmitting and amplifying mechanism for a pressure-responsive instrument, such as an aneroid barometer, which includes a pressure-responsive capsule coupled by a motion-amplifying leverage system to an indicator which includes a pointer journaled to move about a calibrated dial plate. The various components of the motion-transmitting and amplifying mechanism are of a snap-on construction.

5 Claims, 9 Drawing Figures

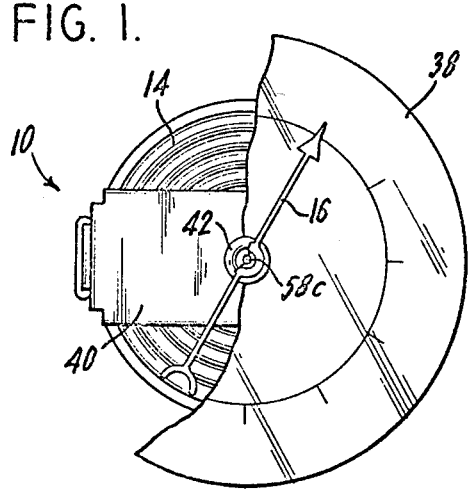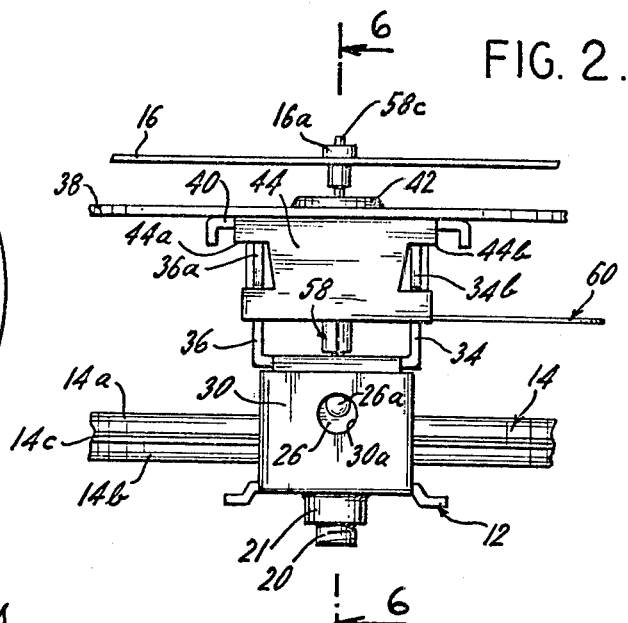

PRESSURE-RESPONSIVE INSTRUMENT

This is a division, of application Ser. No. 279,980 filed Aug. 11, 1972.

The present invention relates generally to pressure-responsive instruments and, in particular, to an improved and simplified instrument movement finding useful application in indicating, recording, and signaling apparatus, such as barometers and altimeters.

In a typical instrument movement for an aneroid barometer or the like, there is provided a capsule which is pressure-responsive and is coupled through a motion-amplifying system to an indicator, usually a rotatable pointer moving over an appropriate calibrated dial face. Throughout the years, various instrument mechanisms of this general type have been suggested, but there is ever present the need for further simplification of such mechanisms to provide low-cost instrument motions which are capable of manufacture on a mass production basis and at relatively low-unit cost.

Accordingly, it is an object of the present invention to provide an improved and simplified motion-amplifying and transmitting mechanism for an instrument movement, such as an aneroid barometer.

Specifically, it is an object of the present invention to provide an instrument movement for a barometer which is of simplified construction, easily calibrated and capable of manufacture on a mass production basis at relatively low-unit cost.

It is a further object of this invention to provide an instrument movement for a barometer which is rugged in construction and which may be assembled in a relatively easy manner.

In accordance with an illustrative embodiment demonstrating objects and features of the present invention, there is provided a pressure-responsive instrument which comprises a baseplate and a capsule having a wall portion movable in response to changes in fluid pressure therein. The capsule is mounted on the baseplate for adjustment and calibration by a depending threaded stud which is operatively connected to the capsule and received within a threaded sleeve in the baseplate. A frame serves to mount the motion-amplifying and transmitting mechanism and is constructed and arranged to provide a snap-on connection to the baseplate. The motion-amplifying and transmitting mechanism includes an actuating lever pivotally mounted on the frame at a selectable first pivot. Means are provided for coupling the actuating lever to the capsule for movement in response to the movable wall portion thereof and means are provided at respective ends of the actuating lever for limiting the pivotal movement of the lever in response to the capsule. An indicator, including a pointer arbor, is journaled on the frame axially of the capsule at right angles to the first pivot. A coupling pulley is pivotally mounted on the frame at a pivot which is parallel to and spaced from the pivot of the actuating lever. The coupling pulley is connected to a cord which is wound around the arbor, one end of the cord being connected to a bias spring and the other end of the cord being wound around the coupling pulley and connected to the actuating lever. Means are provided for maintaining the cord wound around the arbor and for preventing this cord from interfering with the mounting frame.

The above brief description, as well as further objects, features and advantages of the present invention will be more fully understood by reference to the following detailed description of a presently preferred but nonetheless illustrative embodiment in accordance with the present invention, when taken in conjunction with the accompanying drawings, wherein:

FIG. 1 is a plan view of a pressure-responsive instrument embodying features of the present invention, the dial plate being partially broken away for the purpose of clarity in illustration;

FIG. 2 is an enlarged sectional view taken from the left of FIG. 1 showing further details of the movement;

FIG. 3 is an enlarged elevation view taken from the front of FIG. 1 showing further details of the movement;

FIG. 4 is a sectional view, on an enlarged scale, taken substantially along the line 4—4 of FIG. 3;

FIG. 5 is a top plan view showing details of the coupling pulley useful with the present invention;

FIG. 9 is a partial sectional view, taken substantially along the line 9—9 of FIG. 8, and showing the pivot seat for the actuating lever of the present invention.

Figure 6:
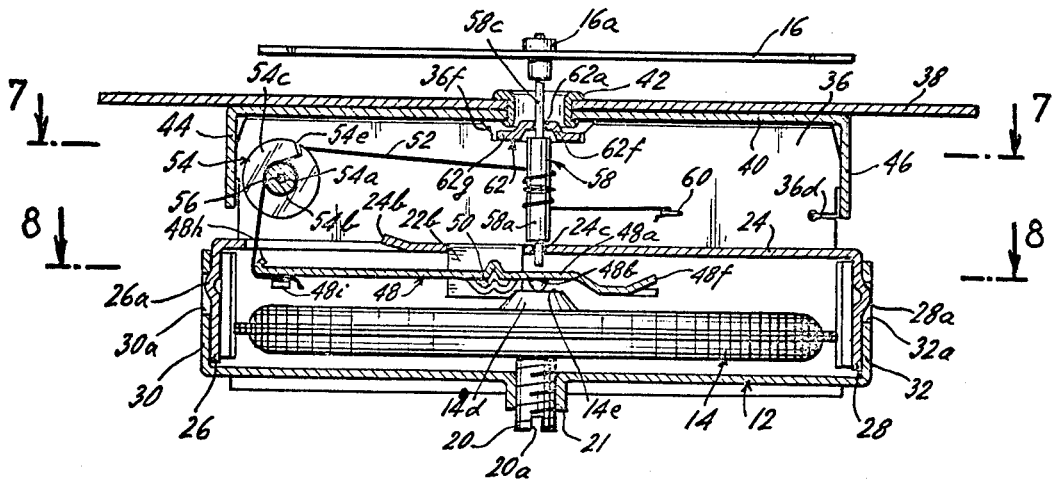
FIG. 6 is a sectional view, on an enlarged scale, taken substantially along the line 6—6 of FIG. 2.

Referring now to the drawings, there is shown a pressure-responsive instrument for a barometer, generally designated by the reference numeral 10, embodying features of the present invention, the pressure-responsive instrument being shown removed from the usual outer casing or housing. Pressure-responsive instrument 10 includes a baseplate, generally designated 12, which is adapted to be disposed within the housing or outer casing for the pressure-responsive instrument. Mounted on baseplate 12 is a capsule mechanism, generally designated 14, which is generally circular in configuration and includes opposed corrugated capsule or diaphragm plates 14a, 14b which are secured together along their perimeters at 14c. Capsule mechanism 14 is of a design such that a wall portion of plate 14a will move toward and away from plate 14b in response to changes in the fluid pressure within capsule mechanism 14, as is generally understood. By way of example, capsule mechanism 14 may be similar to that disclosed in U.S. Pat. Application Ser. No. 58,343 filed July 27, 1970 for "Barometer Capsule and Method of Manufacture" by Eberhard et al. The movable wall portion 14a of capsule mechanism 14 is formed with a centrally-disposed nipple 14d which has a flat top 14e (see FIG. 6) which moves into successive planes parallel to baseplate 12 in response to changes in fluid pressure and provides the sensing motion to be transmitted to a pointer 16 by a motion-transmitting and amplifying mechanism, generally designated by reference numeral 18.

Capsule 14 is adjustably mounted on baseplate 12 for the purpose of calibrating the movement or mechanism of pressure-responsive instrument 10 by the simple expedient of securing to a wall portion opposite nipple 14d a threaded calibration and adjustment stud 20. Stud 20 extends axially of capsule 14 and is received within a corresponding threaded hole or sleeve 21 formed centrally of baseplate 12. The lower end of threaded adjustment stud 20 is provided with a transverse cut 20a to facilitate the insertion therein of a screwdriver blade or the like such that the flat top 14e of nipple 14d of capsule 14 may be oriented at the requisite spacing to baseplate 12 to calibrate the instrument, as is generally understood.

The motion-transmitting and amplifying mechanism 18 is supported by a mounting frame, generally designated 22, which includes a mounting plate 24 in spaced parallel relation to baseplate 12. Mounting plate 24 extends in a plane generally parallel to and over capsule 14. Depending generally downwardly from mounting plate 24 are finger elements 26, 28 which are adapted to fit into corresponding finger-receiving elements 30, 32 extending generally upwardly from baseplate 12. Finger-receiving elements 30, 32 may be bent inwardly along their peripheral edges in order to define a channel into which the corresponding finger elements fit (see FIG. 8).

In order to provide a snap-on connection between mounting frame 22 and baseplate 12, finger elements 26, 28 include outwardly extending dimples 26a, 28a which are adapted to fit within corresponding holes 30a, 32a in finger-receiving elements 30, 32 with the finger-receiving elements resting on the sloping dimples, as indicated in FIGS. 2 and 6. Thus, when finger element 26 is inserted into finger-receiving element 30, dimple 26a is adapted to be received near the top of hole 30a such that there is a definite interfit between the dimple and its corresponding hole. This interfit provides a snap-fit connection and also biases frame 22 downwardly relative to baseplate 12. The downward bias force is provided by the engagement of the finger-receiving elements at the upper half of the sloping dimples since the finger-receiving elements, which have been flexed outwardly over the peak of the dimples, flex inwardly exerting a force normal to the dimples. The force may be resolved into horizontal and vertical components, the latter exerting a downward force on the frame relative to the baseplate.

Mounting frame 22 also includes parallel spaced walls, generally designated 34, 36 projecting generally upwardly and perpendicularly from mounting plate 24.

A dial plate, generally designated 38, including appropriate indices of calibrations on the upper surface thereof, is adapted to be mounted on walls 34, 36 with an appropriate snap-fit connection. Depending downwardly from dial plate 38 is dial plate mounting frame 40, which is secured to dial plate 38 by an annular rivet 42 in axial alignment with the motion-transmitting nipple 14d of capsule 14.

Referring to FIGS. 2 and 6, dial plate mounting frame 40 includes downwardly depending projections 44, 46 located at the ends of the dial plate mounting frame which are adapted to engage the walls 34, 36 of mounting frame 22 thereby securing the dial plate to the mounting frame. More particularly, projection 44 is shaped to include notches 44a, 44b which are adapted to engage corresponding flanges of walls 34, 36 thereby securing dial plate 38 to mounting frame 22. Specifically, notch 44a of projection 44 is adapted to an engage V-shaped flange 36a of wall 36 while notch 44b is adapted to an engage V-shaped flange 34b of wall 34 (see FIG. 2). The inner walls of notch 44a and 44b are slightly angled thereby centering the dial plate relative to frame 22.

In order to guide dial plate mounting frame 40 around walls 34, 36 of mounting frame 22 during assembly, projection 44 is formed with two extensions which are adapted to be bent around, underneath the V-shaped flanges. One such extension 44c is illustrated in FIG. 3 beneath V-shaped flange 34b, the extension being generally parallel with and contiguous to wall 34. In a similar manner, another extension (not shown) of projection 44 is bent around and parallel to wall 36 beneath V-shaped flange 36a.

Projection 46 is substantially identical to projection 44 heretofore described. Thus, as best seen in FIG. 3, projection 46 is formed with a notch 46b adapted to engage a V-shaped flange 34b of wall 34. An extension 46c of projection 46 is bent so as to be parallel to and contiguous with wall 34, beneath the V-shaped flange. As was the case with projection 44, projection 46 is symmetrical about the vertical axis and includes a notch (not shown) and an extension which is bent around so as to be parallel to and contiguous with wall 36. The notch is adapted to engage a corresponding V-shaped flange (not shown) carried by wall 36.

Accordingly, a snap-fit connection is provided between dial plate mounting frame 40 and mounting frame 22 and, in particular, dial plate 38 is centered and held tightly against the mounting frame in order to provide a rattle-proof assembly for the pressure-responsive instrument.

Considering the motion-transmitting and amplifying mechanism 18, this mechanism includes an actuating lever 48 which is journaled on mounting frame 22 for rocking movement about a selectable pivot which extends chordwise of capsule 14. Conveniently, mounting plate 24 of the mounting frame is formed with depending opposed ears 22a, 22b which are struck out of the mounting plate and which provide selectable pairs of bearings 22c, 22d and 22e, 22f for a pivot pin 50 for actuating lever 48.

Figure 8:
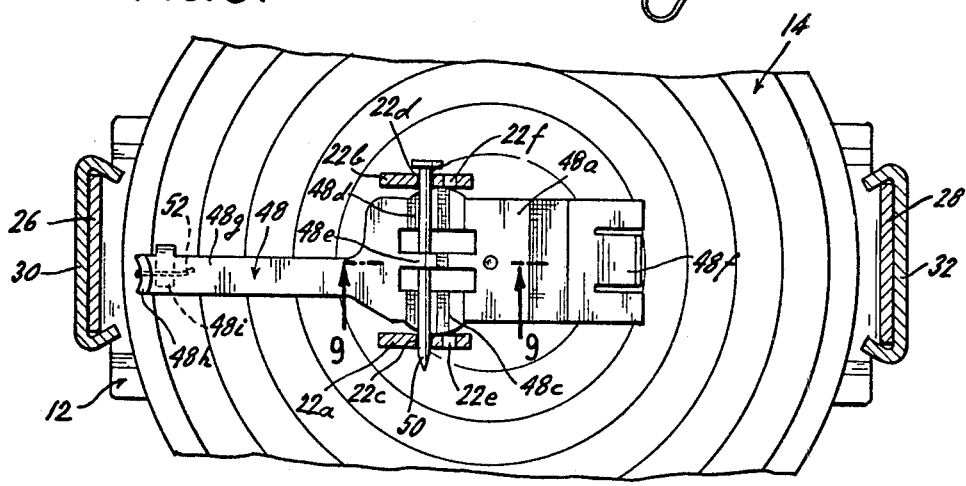
FIG. 8 is a sectional view, on an enlarged scale, taken substantially along the line 8—8 of FIG. 6.

As best seen in FIGS. 6, 8 and 9, actuating lever 48 is formed with an arm 48a overlying the nipple of the capsule mechanism and includes a depending projection 48b (see FIG. 6) which bears against flat top 14e of capsule 14. Accordingly, and as will be explained hereinafter, as the flat top 14e of nipple 14d moves in response to expansion and contraction of capsule 14, actuating lever or member 48 will rock or pivot about pivot pin 50. Actuating lever 48 is also formed with two selectable seats for pivot pin 50 in order to provide a selectable fulcrum or pivot for the actuating lever. This is advantageous, for example, for providing a degree of flexibility in changing the leverage ratio and, therefore, the scale factor of the pressure-responsive instrument. As indicated in FIGS. 8 and 9, actuating lever 48 is formed with a pair of stampings 48c, 48d, the pair of stampings defining either a first seat $S_1$ or a second seat $S_2$ for pivot pin 50. A crossbar 48e, which also is stamped from actuating lever 48, seats pivot pin 50 in either one of seats $S_1$ or $S_2$. It is to be noted that if pivot pin 50 is seated in seat $S_1$, then the pivot pin engages bearings 22c, 22d. On the other hand, if the pivot pin pivots the actuating lever about seat $S_2$, then the pivot pin engages bearings 22e, 22f. Actuating lever 48 is advantageously balanced about the juncture of seats $S_1$ and $S_2$ to reduce any position errors as the mechanism is oriented in different positions.

Actuating lever 48 is also formed with an adjustable stop 48f formed at one end of the actuating lever. Stop 48f is set at an angle, by way of example approximately 20° to the actuating lever, such that the adjustable stop extends upwardly from the end of the actuating lever (see FIG. 3). Stop 48f limits the motion of the actuating lever as the actuating lever pivots in a counterclockwise direction (when viewed in FIG. 3) in response to expansion of the capsule 14 by abutting the bottom of mounting plate 24.

Figure 7:
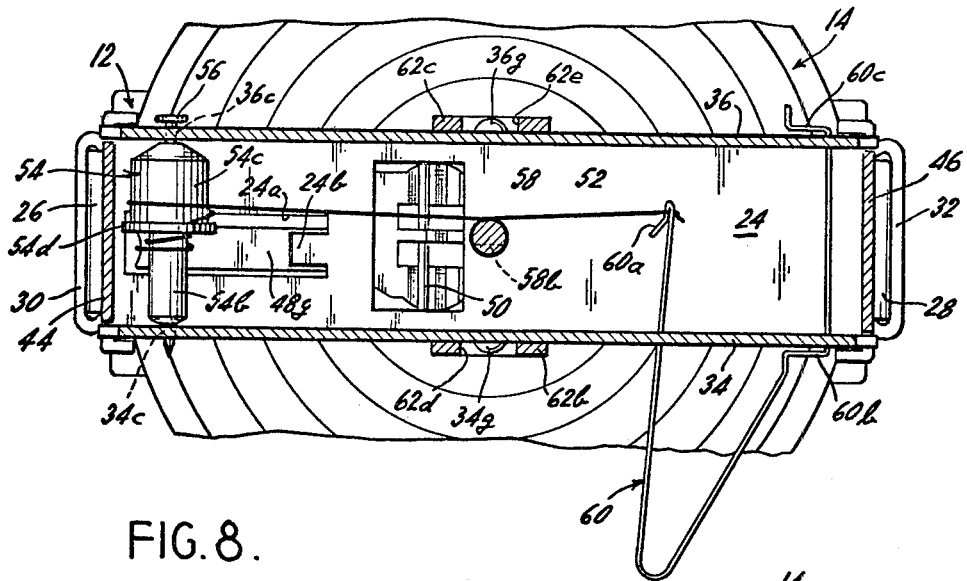
FIG. 7 is a sectional view, on an enlarged scale, taken substantially along the line 7—7 of FIG. 6.

Actuating lever 48 also includes a somewhat narrower arm portion 48g having an end which is bent upwardly and curved inwardly at 48h in order to receive a cord 52 which passes through an opening 24a in mounting plate 24 (see FIG. 7). The end of cord 52 passes over curved end 48h and is secured to the bottom of actuating lever 48 by a downwardly extending projection 48i which is crimped over the cord. In order to provide a stop for actuating lever 48 as the lever pivots in the clockwise direction, mounting plate 24 includes an adjustable stop 24b which extends upwardly, at a slight angle, at opening 24a of the mounting plate. Thus, when actuating lever 48 moves in a clockwise direction (when viewed in FIG. 6) in response to contraction of capsule 14, arm portion 48g will abut stop 24b, after a predetermined rotation of the lever, thereby limiting movement of the actuating lever. Thus, by providing stop 24b on mounting plate 24 and by providing stop 48f on the actuating lever, the range of pivotal or rocking movement of actuating lever 48 is controlled.

Cord 52 is connected to a coupling, differential or ratio pulley, generally designated 54, which is disposed between the upstanding walls 34, 36 of mounting frame 22. Specifically, coupling pulley 54, which may be advantageously of a molded plastic construction, includes a central bore 54a through which is inserted a pivot pin 56, the latter also resting in bearings 34c, 36c in walls 34, 36. The location of bearings 34c, 36c is such that pivot pin 56 is disposed generally parallel to and spaced from pivot pin 50 of the actuating lever. Pivot pin 56 is also advantageously slightly larger in diameter than the diameter of central bore 54a thereby providing a force fit between the pivot pin and the coupling pulley.

Referring to FIG. 5, coupling pulley 54 is formed so as to include a generally cylindrical pulley surface 54b and a generally cylindrical pulley surface 54c. Pulley surface 54b is of a diameter smaller than that of pulley surface 54c, the two pulley surfaces being separated by a cylindrical flange 54d. By way of example, the diameter of pulley surface 54c may be twice the diameter of pulley surface 54b. Cord 52 extends upwardly from actuating lever 48 and is wrapped around, one or more times, pulley surface 54b. The cord then passes through a slit 54e in flange 54d. Slit 54e is sized in relation to cord 54 to effectively anchor the cord at the slit. Accordingly, cord 52 operatively connects actuating lever 48 with coupling pulley 54 so that rocking motion of the actuating lever is transmitted to the coupling pulley. Cord 52 exits slit 54e and is wound around, 1 times or more, pulley surface 54c.

Cord 52 comes off pulley surface 54c generally tangentially and is wound or wrapped around an arbor, generally designated 58, for pointer 16. Specifically, cord 52 is wrapped around a cylindrical arbor portion 54a which may be formed to include a slit 58b (see FIG. 4) which effectively anchors the cord to arbor portion 58a thereby precluding slippage of the cord relative to the arbor.

Cord 42 then continues to be wrapped around arbor portion 58a and comes off the arbor in a generally tangential direction wherein the end of cord 52 is secured to an instrument and indicator spring, generally designated 60, by the simple expedient of inserting the cord into the already crimped end 60a of the bias spring. It has been found that this is sufficient to adequately secure the cord to the bias spring without the need to knot or otherwise tie the cord to the bias spring.

Bias spring 60 is generally U-shaped in configuration, extends through an opening 34e in wall 34 (see FIG. 3) and is mounted on walls 34, 35 of mounting frame 22 in mounting slots 34d, 36d defined in the walls. Once bias spring 60 is inserted into mounting slots 34d, 36d, the tensioning of the bias spring by its connection to cord 52 tends to firmly seat the spring in the mounting slots. The bias spring may be further secured within the mounting slots by the bent extensions of projection 46, such as extension 46c (see FIG. 3), which prevent the bias spring from moving outwardly in a direction parallel to walls 34, 36. Additionally, bias spring 60 may be formed so as to include spring portions 60b, 60c (see FIG. 7) which are bent so as to be generally parallel to walls 34, 36, thereby constraining relative motion between the bias spring and walls 34, 36 in a direction generally perpendicular to the walls. Although the spring is constrained, there is normally no contact between walls 34, 36 and spring portions 60b, 60c and spring 60 is allowed to pivot in slots 34d, 36d to align itself with cord 52.

Referring now to FIGS. 3, 4 and 6, arbor 58 is journaled on mounting frame 22 such that the arbor is generally perpendicular to the plane of mounting plate 24, is axial of capsule mechanism 14 and is at right angles to pivot pin 50 of the actuating lever. Specifically, arbor 58 is machined to include an arbor shaft 58c which is journaled, at one end thereof, in a bearing hole 24c in mounting plate 24. The other end of arbor shaft 58c is journaled in a bearing hole 62a defined in an inverted U-shaped bearing plate, generally designated 62 (see FIG. 4). Bearing plate 62 includes depending legs 62b, 62c which seat crosswise at the top of walls 34, 36. In order to properly orient bearing plate 62 relative to walls 34, 36, the bearing plate is adapted to rest crosswise in notches 34f (see FIG. 3) and 36f (see FIG. 6) defined at the top of walls 34, 36. Bearing plate 62 is also constructed so as to provide a snap-fit connection between the bearing plate and walls 34, 36. As indicated in FIG. 4, such a snap-fit connection is provided by cutouts 62d, 62e defined, respectively, in depending leg 62b, 62c of bearing plate 62. The bottom of these cutouts are adapted to engage respective ramp-like projections 34g, 36g of walls 34, 36. Thus, the interfit of these ramp-like projections of walls 34, 36 with depending legs of bearing plate 62 provides a rattle-proof assembly which holds the bearing plate adequately in place.

Referring to FIG. 4, it is to be noted that bearing plate 62 includes an upwardly extending nipple 62f, with arbor portion 58a of arbor 58 adapted to fit into the space formed by the nipple. One particular advantage of such a construction is that the top surface 62g of the bearing plate acts as a flange and prevents the cord 52 from creeping up arbor portion 58a and wrapping around arbor shaft 58c thereby fouling the operation of the mechanism.

Arbor shaft 58c continues through bearing hole 62a of bearing plate 62 and extends upwardly through the center of annular rivet 42. Pointer 16 is adapted to rest on and be carried by arbor shaft 58c by an appropriate cap 16a which rests on the top of shaft 58c such that rotation of arbor shaft 58c, caused by movement of cord 52, causes pointer 16 to move in an arcuate direction along the top of dial plate 38.

In order to facilitate a more thorough understanding of the present invention, a typical assembly sequence and a typical sequence of operation will now be described:

The pressure-responsive instrument 10 is generally of a three-piece subassembly configuration with capsule 14 carried by baseplate 12 forming one of the subassemblies; with the motion-transmitting and amplifying mechanism 18 carried by mounting frame 22 forming the second of the subassemblies; and, with dial plate 38 and dial plate mounting frame 40 forming the third subassembly.

The first subassembly is assembled wherein capsule mechanism 14 is mounted on baseplate 12 by way of calibration and adjustment stud 20 which is screwed into sleeve 21 of the baseplate such that the motion-transmitting nipple 14d faces upwardly and away from baseplate 12.

The second subassembly is assembled such that actuating lever 48 is disposed beneath mounting plate 24 with the actuating lever adapted to be pivoted about a fulcrum, the fulcrum selectable depending on the location of pivot pin 50 in bearings 22c, 22d and seat S$_1$ or bearings 22e, 22f and seat S$_2$. Cord 52 is secured at one end thereof to the end of actuating lever 48 by crimping extention 48i over the cord. The cord is wrapped around pulley surface 54b of coupling pulley 54, inserted to slit 54e of flange 54c (thereby effectively securing the cord at this point) and is wrapped around pulley surface 54c of the coupling pulley. Coupling pulley 54 is secured to mounting frame 22 by pivot pin 56 which mounts the coupling pulley between walls 34, 36 of the mounting frame.

There are numerous advantages in using a coupling pulley similar to that disclosed herein. First, coupling pulley 56 is a molded part and, therefore, it is possible to hold the diameters of pulley surfaces 54b, 54c to much greater tolerance as compared to other types of lever systems, for example, if a bellcrank lever system with two different lever arms was utilized. Being molded, this part is also relatively inexpensive to manufacture and cord 52 can readily be secured in slit 54e, the "memory" of the molded plastic anchoring the cord at this point without the need of glue or the like. The cord is merely slipped into the slot and held in place and this enables a continuous cord to be used (rather than two cords). Furthermore, the coupling pulley is a perfectly symmetrical and balanced structure so that there are no offsetting forces as would be the case if a bellcrank lever with two different lever arms was used. The pulley is balanced in all positions or orientations of the barometer. Another advantage of this type of coupling pulley over that of a bellcrank mechanism having two lever arms is that the location of the coupling pulley is in no way critical to the location of the pivot point for the coupling lever. Lastly, this type of mechanism provides an advantage over conventional bellcrank lever mechanisms having two lever arms in that cord comes off the coupling pulley in a single plane while, with a bellcrank lever, the angle of attack relative to the arbor changes as the bellcrank rotates, therefore, the use of a coupling pulley provides a mechanism which can be calibrated and set up relatively easily since there is no problem with "squaring" the mechanism as with conventional bellcrank mechanisms.

Cord 52 comes off the coupling pulley and is wound around arbor portions 58a of arbor 58. The arbor is maintained in its upright position by arbor shaft 58c which is journaled to mounting plate 24 and to bearing plate 62, the latter snap-fitted in place to walls 34, 36 of frame 22. The cord is wrapped around the arbor (secured to the arbor by slit 58b) and is secured to biasing spring 60 by inserting the cord into the crimped end 60a of the spring. The biasing spring is inserted into the slots formed in walls 34, 36 and the biasing force of the cord causes the spring to remain in place.

The subassembly including motion-transmitting and amplifying mechanism 18 is snapped onto the subassembly carrying capsule 14. In other words, finger elements 26, 28 of mounting frame 22 are inserted into the finger-receiving elements 30, 32 of the baseplate. A snap-on construction is provided by the interaction of the dimple 26a, 28a with holes 30a, 32a. With these two subassemblies in place, the dial plate subassembly is connected, with the annular rivet 42 located around the upwardly extending arbor shaft 58c. The dial plate subassembly is snapped into place with the downwardly depending projections 44, 46 of dial plate mounting frame 40 interengaging the V-shaped flanges carried by the walls of mounting frame 22.

In operation, changes in atmospheric or other pressure within capsule 14 cause the motion-transmitting nipple 14d to rise and fall in planes parallel to baseplate 12. This, in turn, causes a rocking or pivoting action of actuating lever 48 which motion is transmitted, via cord 52, to coupling pulley 54. The motion of coupling pulley 54 (which is amplified by the amplifying ratio between the two pulley surfaces) is transmitted to arbor 52 which, in turn, causes pointer 16 to move thereby indicating the correct atmospheric pressure. Bias spring 60 is provided to bias the mechanism. Stops 48f on the actuating lever and 26b on the mounting plate provide limits for the pivotal motion of the actuating lever.

From the foregoing, it will be appreciated that there has been provided a relatively simple and correspondingly inexpensive motion-amplifying mechanism for a pressure-responsive instrument which has the requisite functionality for its intended purposes. The construction is such that it may be mass produced and the calibration is simple, easy and direct. Further, the construction of the pressure-responsive instrument is such that the overall mechanism is rugged and that there is provided rattleproof interconnections between the various parts thereof. In fact, it has been found that the actual mounted mechanism can be dropped through a free fall of approximately four to six feet on to a hard surface without adversely harming the mechanism.

Obviously, numerous modifications of the invention are possible in light of the above disclosure. It is to be understood, therefore, that the foregoing constitutes only one application of the present invention and that other variations and embodiments thereof are possible in light of the disclosure.

What is claimed is:

1. A motion-amplifying mechanism for a pressure-responsive instrument comprising a supporting frame for said motion-amplifying mechanism having a mounting plate, an actuating lever, means pivotally mounting said actuating lever on said frame at a first pivot extending parallel to the plane of said mounting plate, indicator means including a pointer arbor journaled on said frame perpendicular to the plane of said mounting plate, a differential coupling pulley, means pivotally mounting said coupling pulley on said frame at a second pivot parallel to and spaced from said first pivot, a cord wound around said arbor and operatively connected to said coupling pulley and to said actuating lever and a common instrument and indicator bias spring operatively connected to said cord.

2. The invention according to claim 1 wherein said acutating lever includes means for selectively pivoting said actuating lever at a first actuating lever pivot position or a second actuating lever pivot position.

3. The invention according to claim 1 wherein said actuating lever includes means disposed at one end thereof for providing a stop when said actuating lever is pivoted in a first direction and means disposed at the other end of said actuating lever for providing a stop when said actuating lever is pivoted in the opposite direction.

4. The invention according to claim 1 wherein said frame includes means for preventing said cord wound around said arbor from traveling up said arbor and fouling the operation of said indicator means.

5. A motion-amplifying mechanism for a pressure-responsive instrument comprising a supporting frame for said motion-amplifying mechanism, an actuating lever, means pivotally mounting said actuating lever on said supporting frame, indicator means including a pointer arbor journaled on said frame, a differential coupling pulley having an input side and an output side, means pivotally mounting said differential coupling pulley on said frame at a second pivot, a cord operatively connecting said actuating lever to the input side of said coupling pulley so that when said actuating lever rotates around said first pivot the rotational motion is directly imparted to said coupling pulley, said cord operatively connecting the output side of said coupling pulley to said pointer arbor so that when said coupling pulley is caused to rotate about said second pivot the rotation is directly imparted to said arbor, whereby the amplification factor of the motion-amplifying mechanism is substantially independent of the relative locations of said first and second pivots and a common instrument and indicator bias spring operatively connected to said cord.

* * * * *